United States Patent Office 2,950,735
Patented Aug. 30, 1960

2,950,735

FLOW CONTROL RESISTANCE

Victor L. Streeter, Ann Arbor, Mich., assignor to The Dole Valve Company, Chicago, Ill., a corporation of Illinois Filed Oct. 15, 1956, Ser. No. 615,786

4 Claims. (Cl. 137—519)

The present invention relates to improvements in flow control devices and flow meters and more particularly to a valve arrangement used as either a flow control or a flow meter and especially an improved means for operating the valve.

The present invention contemplates the provision of a flow control valve including an orifice with a movable head positioned therein.

The orifice is profiled so that with the variations in positions of the head there will be a change in cross-sectional flow area in the throat between the head and orifice so that with displacement of the valve head within the orifice in the downstream direction the throat area will decrease. The head is biased by a nonlinear force.

The invention also contemplates use as a flow metering device wherein a head is movably positioned within an orifice and the orifice is so shaped that it will increase in cross-sectional area in a downstream direction. A biasing force is applied to the head which moves within the orifice with variance in pressure head. The pressure drop across the orifice is a linear function of the fluid flow through the throat area between the head and orifice.

The improved biasing means for controlling the position of the head for either the flow control or the flow meter consists of a dead weight resistance which is suspended on a cable which is threaded over the curved contour of a shaped pivotal cam. The cable is secured to the valve to provide a nonlinear force displacement relation between the valve head and the fluid. A special relationship is present between the contour of the orifice and the shape of the cam.

It is an object of the invention to provide an improved fluid flow control mechanism which is simple and reliable and accurately obtains a constant flow with changing pressure head.

Another object of the invention is to provide an improved fluid flow metering valve which is simple and reliable and accurately measures the rate of flow of fluid stream as a linear function of the pressure drop across the valve.

Another object of the invention is to provide an improved nonlinear force or resistance for controlling a movable valve member used in a flow control device or a flow metering device.

Another object of the invention is to provide a non-linear resistance for controlling the position of the valve member used in connection with a flow control device or a flow metering device wherein the force is obtained by a weight suspended on a cable which is run over a shaped cam.

Another object of the invention is to provide a non-linear force for controlling the position of a valve disk or head relative to an orifice wherein the force performs in accordance with the law $$y = \frac{Y_0}{\ln H} \ln \frac{F_0 H}{F}$$

Another object of the invention is to provide a non-linear force for controlling the position of a valve head within an orifice for use in a flow control or flow meter wherein the force consists of a weight suspended on a cable passing over a cam and the surface of the cam follows the relationships of $$F_0 \rho_0 e^{\frac{\alpha \ln H}{\alpha \sigma}} + G\rho_0 = W\rho \cos(\theta - \alpha)$$

and $$\alpha \tan(\theta - \alpha) = \frac{\ln H}{1 + \frac{G}{F_0}} e^{\frac{-\alpha}{\alpha \sigma} \ln H}$$

Another object of the invention is to provide a valve usable as a flow metering valve or a flow control valve wherein a force is applied to the valve comprising a weight suspended on a cable passed over a profiled cam to yield a non-linear resistance to the movement of the movable valve member and wherein the movable valve member is a disc positioned within an orifice having a surface constructed in accordance with the relationship $$x = \frac{2Y_0}{\ln H} \left\{ \ln \left[ 2\sqrt{2} \frac{r_0 + \frac{t}{2}}{r'^2 - r_0^2} \frac{Y_0}{\ln H} \sqrt{1 - \sqrt{1 - \left(\frac{t \ln H}{Y_0}\right)^2}} \right] - \frac{1}{2} \left[ 1 - \sqrt{1 - \left(\frac{t \ln H}{Y_0}\right)^2} \right] \right\}$$

Other objects and advantages will become more apparent in the following disclosure of the invention presented in the specification and claims and taken in connection with the appended drawings in which:

Figure 3 is a schematic view of the cam used in providing the nonlinear resistance to movement of the valve and illustrating the dimensions used in the mathematical definition of the profile of the cam.

Figure 1:
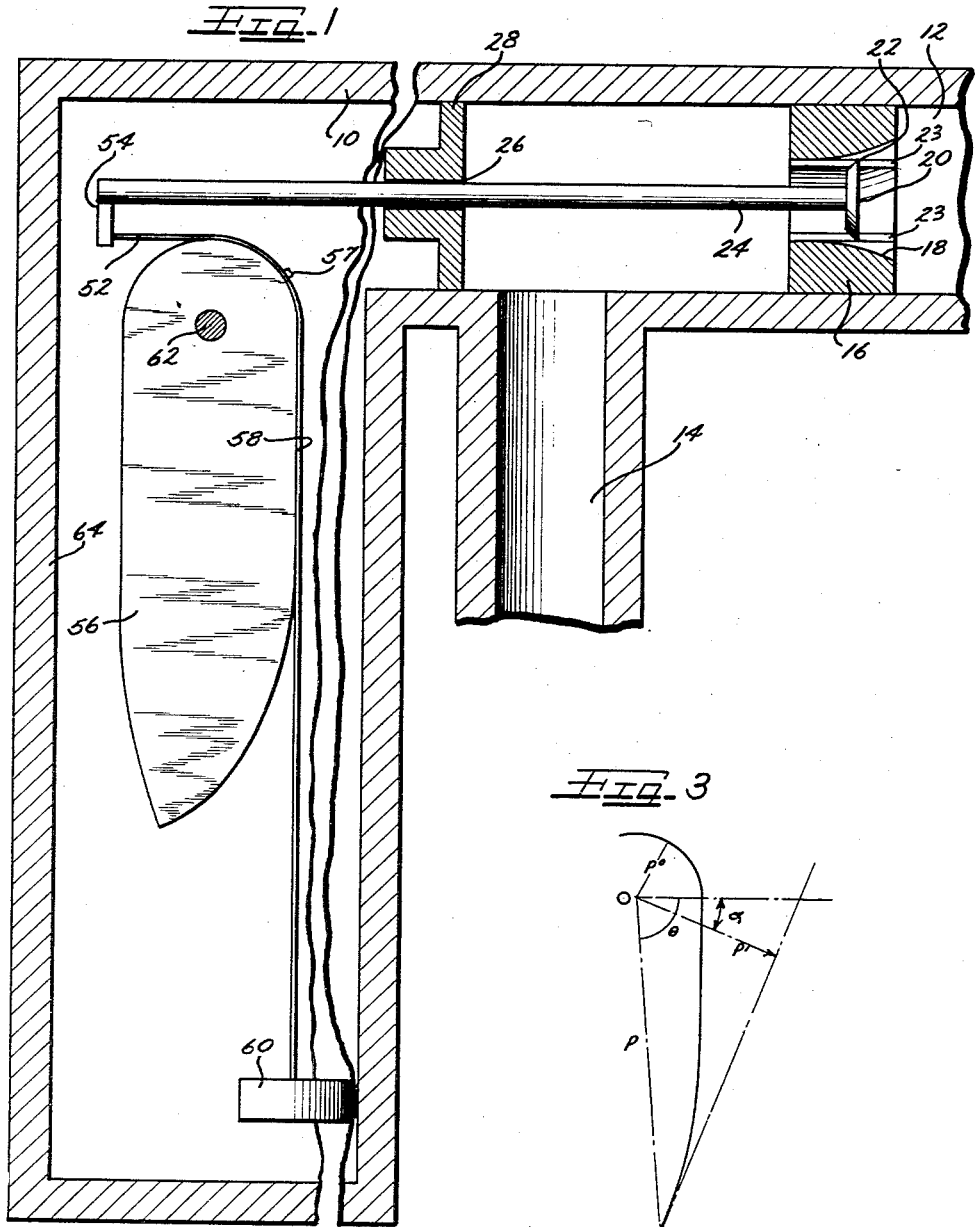
Figure 1 is a somewhat schematic sectional view of a flow control valve utilizing the principles of the present invention.

As illustrated in Figure 1, the mechanism is utilized as a flow control device. The flow control mechanism has a casing or housing 10 provided with an inlet opening 12 and a discharge opening 14. Positioned in the housing between the inlet and discharge is an orifice defining member 16 having a curved inner surface of revolution 18 defining a throat through which the flow stream of fluid passes.

Movably located within the throat is a valve head or disk 20 being thin and flat and having a sharp outer peripheral edge 22 to reduce the flow losses, turbulence and so fourth. Vanes or guides 23 may be provided to center the disc within the orifice if desired but can be omitted in some circumstances and are not taken into account in the mathematical definition of the orifice given below.

The valve head is mounted on a supporting stem 24 which passes through an opening 26 in a barrier member 28 and connects at its left end to the nonlinear resistance which provides a biasing force for the valve head in opposition to the pressure head of the fluid entering the inlet 12. The opening 26 provides a free support for the stem and is not necessarily a seal and the cable and weight will normally be submerged in the fluid.

The orifice and movable valve disk therein operate in accordance with the principles set forth in my copending application "Adjustable Flow Control," Serial No. 446,-

867, filed July 30, 1954. In accordance therewith the flow follows the relationship $$C_D A = (C_D A)_{min} e^{\frac{x' \ln H}{2Y_0}} \quad (1)$$

The surface of revolution or the throat profile is constructed with the relationship $$x = \frac{2Y_0}{\ln H} \left\{ \ln \left[ 2\sqrt{2} \frac{r_0 + \frac{t}{2}}{r'^2 - r_0^2} \frac{Y_0}{\ln H} \sqrt{1 - \sqrt{1 - \left(\frac{t \ln H}{Y_0}\right)^2}} \right] - \frac{1}{2} \left[ 1 - \sqrt{1 - \left(\frac{t \ln H}{Y_0}\right)^2} \right] \right\} \quad (2)$$

Figure 2:
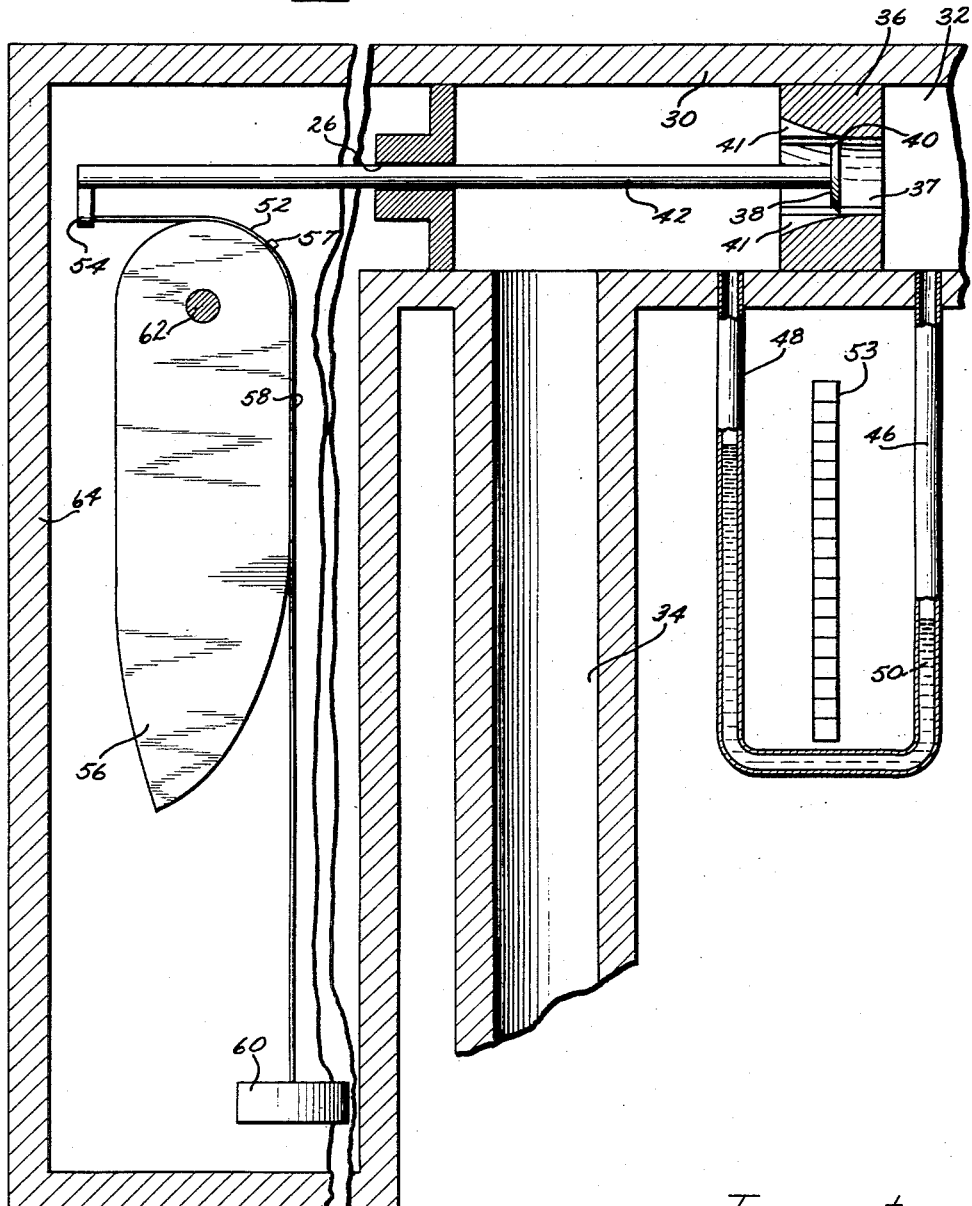
Figure 2 is a somewhat schematic sectional view illustrating the invention utilized as a flow metering device.

As illustrated in Figure 2 the relationship between the movable valve disk or head and the orifice is utilized to provide a flow meter. The mechanism of Figure 2 includes a meter housing 30 provided with an inlet 32 and a discharge 34. Between the inlet and discharge is an orifice defining member 36 which has the shape of the orifice defining member 16 in Figure 1 and is reversed in position. Within the shaped orifice 37 is a movable valve disc or head 38 having a thin knife edge 40. Again, guides 41 may be provided to center the valve head 38. The valve head 38 is mounted on a stem 42 which is urged, to the right, as shown in Fig. 2, by a non-linear biasing force. Again the throat follows the relationship shown by Formula 2 above and a non-linear biasing force is utilized.

The pressure drop across the head is a linear function of the flow through the orifice. The pressure drop across the orifice can be obtained by pressure differential sensing means shown in the form of a manometer 44. One end 46 of the manometer tube is connected to the upstream side of the orifice and the other end 48 is connected to the downstream side. The fluid 50 in the manometer tube will form different levels in the two legs of the tube and the difference in levels can be read from a scale 53 which is graduated linearly to read the flow in terms of flow rate.

Considering construction and features of the non-linear resistance which is utilized in both the meter of Figure 2, and the flow control of Figure 1, the left end of the valve stem 24 in Fig. 1, and 42 in Fig. 2, is connected to a cable 52 by a suitable connecting means 54. The cable passes downwardly over the cam 56 which has a curved outer profile 58. At the lower end of the cable is connected a weight 60. The pin 57 prevents the cable from slipping along the cam. The cam is pivotally suspended on a frictionless suspension shaft 62 so that as the forces between the weight 60 and the pressure differential across the valve disc 22 or 38 seek a balance, the cam 56 will have pivotal movement.

The valve heads 20 and 38 are shown in a horizontally movable position with the cable 52 connected in the manner illustrated. It will be understood, however, that various other positional arrangements can be adapted if the position of the valve is to be altered in order to transfer the force of the cable 52 to the valve stem. For example a frictionless pulley arrangement could be used if the valve head were in a position to have vertical movement. The cam 56 and cable 52 are shown housed in a chamber 64 to afford protection of the cable or weight to the cam by extrinsic forces and avoid influencing the position due to air currents and the like.

Adjustment of the flow controller for different discharges or of the flow meter for different ranges can be accomplished by changing the cable length 52 between fitting 54 and pin 57.

To obtain the correct non-linear force for the movable valve disc a force is applied in accordance with the relationship, $$y = \frac{Y_0}{\ln H} \ln \frac{h_0 H}{h} \quad (3)$$

The terms and symbols used in the above equation are set forth in the definition which will be presented later herein. This non-linear resistance, as required by Equation 3 above, can be expressed in terms of force exerted on the disc. Thus force, $F$, is $$F = C_d \pi r_0^2 \gamma h \quad (4)$$

where $C_d$ is the dimensionless drag coefficient, and $w$ is the unit weight of fluid. The minimum design force $F_0$, is then $$F_0 = C_d \pi r_0^2 \gamma h_0 \quad (5)$$

$C_d$ is assumed to be constant over the range of travel of the disc. Substituting for $h$ and $h_0$ in Equation 3

$$y = \frac{Y_0}{\ln H} \ln \frac{F_0 H}{F} \quad (6)$$

The resistance is obtained by a weight suspended on a cable threaded over a cam and may be phrased a "dead weight resistance." With reference to Figure 3, the relationship of the cam profile will be developed. This relationship yields a non-linear force displacement relationship as set forth in Equation 6 above.

To determine the shape of the cam, reference is made to Fig. 3, where the cam rotates through the angle $\alpha$, from 0 when $F = F_0$, to $\alpha_0$, when $F = F_0 H$. The moment of the weight $W$, about the shaft for any angle $\alpha$ is $$-W\rho \cos(e - \alpha) = F\rho_0 = F_0 \rho_0 H e^{-y \frac{\ln H}{Y_0}} \quad (7)$$

With $\rho_0$ constant, $$\frac{\alpha}{\alpha_0} = 1 - \frac{y}{Y_0} \quad (8)$$

since $\rho_0 \alpha = Y_0 - y$. Letting $W = F_0$, Eq. 8 reduces to $$\rho \cos(e - \alpha) = \rho_0 e^{\frac{\alpha \ln H}{\alpha_0}} \quad (9)$$

For any $\alpha$, Eq. 9 is a straight line in polar coordinates $(\rho, \theta)$. The envelope of the family of straight lines is the cam profile equation. Taking the partial differential of Equation 9 with respect to $\alpha$ and solving simultaneously with Equation 9 to eliminate $\alpha$ yields $$\rho = \rho_0 \sqrt{1 + \left(\frac{\ln H}{\alpha_0}\right)^2} e^{\frac{-\ln H}{\alpha_0} \tan^{-1} \frac{\ln H}{\alpha_0} \cdot \frac{\theta \ln H}{\alpha_0}} \quad (10)$$

which is a logarithmic spiral. By dividing the partial differential of Equation 9 with respect to $\alpha$ by Equation 9

$$\tan(\theta - \alpha) = \frac{\ln H}{\alpha_0} \quad (11)$$

showing that $\theta - \alpha$ is a constant. $\theta$ varies from $$\tan^{-1}(\ln H/\alpha_0) \text{ to } \alpha_0 + \tan^{-1}(\ln H/\alpha_0)$$

in Equation 10.

If a cam is to be designed to support the submerged weight $G$, of the moving parts of the controller, $$F_0 \rho_0 e^{\frac{\alpha \ln H}{\alpha_0}} + G\rho_0 = W\rho \cos(\theta - \alpha) \quad (12)$$

Taking the partial differential with respect to $\alpha$ and dividing by Eq. 12

$$\alpha_0 \tan(\theta - \alpha) = \frac{\ln H}{1 + \frac{G}{F_0}} e^{-\frac{\alpha}{\alpha_0} \ln H} \quad (13)$$

For a series of values of $\alpha$ between 0 and $\alpha_0$, corresponding values of $\theta$ are found. Using these values the corresponding values of $\rho$ are found in Equation 12, yielding polar coordinates of the cam profile.

In the foregoing disclosure and derivation, the following values were referred to:

$C_D$ = discharge coefficient
$C_d$ = drag coefficient
$e$ = base of natural logarithms
$F$ = pressure force on disc
$F_0$ = minimum design force on disc
$G$ = submerged weight of moving parts of controller
$H$ = ratio of maximum fluid head to minimum fluid head
$h$ = head drop across disc
$h_0$ = minimum design head loss across disc
$\ln$ = natural logarithm
$r$ = radial coordinate of throat
$r'$ = minimum throat radius
$r_0$ = disc radius
$t = r - r_0$
$\gamma$ = unit weight of fluid
$W$ = force exerted by submerged weight
$x$ = axial coordinate of throat profile
$x'$ = position of disc in throat
$y$ = displacement of disc from maximum head position ($h = h_0 H$)
$Y_0$ = value of $y$ for $h = h_0$
$\alpha, \alpha_0$ = angle of rotation of the cam
$\theta$ = polar coordinate
$\rho, \rho_0$ = polar coordinate I have, in the drawings and specification, presented a detailed disclosure of the preferred embodiments of my invention, but it is to be understood that I do not intend to limit the invention to the specific forms disclosed but intend to cover all modifications, changes and alternative constructions and methods falling within the scope of the principles taught by my invention.

I claim as my invention:

1. A member for positioning in a flow stream including a housing having an inlet opening and a discharge opening, an orifice defining member positioned within the housing between said openings and having an orifice forming a flow throat therethrough, a poppet member within the orifice member, said members being relatively movable with variations in fluid head to vary the cross sectional flow area through the throat of the orifice defining member, one of said members being profiled to vary the cross sectional area of the throat with movement of the other member, said profile being formed in accordance with the definition $$x = \frac{2Y_0}{\ln H}\left\{\ln\left[2\sqrt{2}\frac{r_0+\frac{t}{2}}{(r'-r_0)(r'+r_0)}\frac{Y_0}{\ln H}\sqrt{1-\sqrt{1-\left(\frac{t \ln H}{Y_0}\right)^2}}\right] - \frac{1}{2}\left[1-\sqrt{1-\left(\frac{t \ln H}{Y_0}\right)^2}\right]\right\}$$

in which:

$x$ is the axial coordinate of throat profile
$Y_0$ is the value of $y$ coordinate for minimum design head loss across poppet member
$H$ is the ratio of maximum fluid head to minimum fluid head
$r_0$ is poppet member radius
$r'$ is the minimum throat radius
$t$ is $r-r_0$ where $r$ equals the radial coordinate of the throat a nonlinear resistance for the movable member including a cable operatively connected thereto, a weight secured to the free end of the cable, and a profiled cam supporting the cable and freely pivotal with the linear changes in cable position to provide a nonlinear backing for the movable valve member.

2. A valve member positionable in a flow stream comprising a housing having an inlet opening and a discharge opening, an orifice member within the housing having a flow throat therethrough, a poppet member positioned within the throat, one of said members movable to vary the cross sectional throat area, a nonlinear support for the movable member including a cable attached thereto, a weight secured to the end of the cable, and a rotatably supported cam over which the cable is passed, the cam having face profile in accordance with the relationship $$F_0\rho_0 e^{\frac{\alpha \ln H}{\alpha_0}} + G\rho_0 = W\rho \cos(\theta-\alpha)$$

3. A valve member positionable in a flow stream comprising a housing having an inlet opening and a discharge opening, an orifice member between said openings with a flow throat extending therethrough, a poppet member within the throat, one of said members being movable, said throat formed by one of said members being profiled in accordance with the relationship $$x = \frac{2Y_0}{\ln H}\left\{\ln\left[2\sqrt{2}\frac{r_0+\frac{t}{2}}{r'^2-r_0^2}\frac{Y_0}{\ln H}\sqrt{1-\sqrt{1-\left(\frac{t \ln H}{Y_0}\right)^2}}\right] - \frac{1}{2}\left[1-\sqrt{1-\left(\frac{t \ln H}{Y_0}\right)^2}\right]\right\}$$

in which:

$x$ is the axial coordinate of throat profile
$Y_0$ is the value of $Y$ coordinate for minimum design head loss across poppet member
$H$ is the ratio of maximum fluid head to minimum fluid head
$r_0$ is poppet member radius
$r'$ is the minimum throat radius
$t$ is $r-r_0$ where $r$ equals the radial coordinate of the throat a non-linear support for the movable member including a cable operatively attached thereto, a weight secured to the end of the cable, and a profiled cam having the cable threaded thereover and being freely pivotal with movement of the cable, the face profile of the cam formed in accordance with the relationship $$F_0\rho_0 e^{\frac{\alpha \ln H}{\alpha_0}} + G\rho_0 = W\rho \cos(\theta-\alpha)$$

4. A fluid valve positionable in the flow stream comprising in combination a housing having an inlet opening and a discharge opening, an orifice defining member positioned between said openings and having a flow throat therethrough, a poppet member within the orifice member, one of said members being movable relative to the other and one of said members having a profiled surface to vary the cross sectional flow throat area with relative movement, a non-linear backing for the movable member including a cable attached thereto at one end, a profiled pivotally supported cam member over which the cable is threaded, a weight secured to the other end of the cable to depend downwardly with the cable resting on the cam member, a shaped outer surface on the profiled cam member supporting the cable and shaped to change the distance of said weight from the pivotal center of the cam member with rotation of the cam member to apply force to said movable member in accordance with the relationship $$F = F_0 H e^{\frac{-y \ln H}{Y_0}}$$

in which:

$F$ is pressure force on movable member
$F_0$ is minimum design force on movable member H is ratio of maximum fluid head to minimum fluid head
e is the base of natural logarithm
y is the displacement of movable member from maximum head position
$Y_0$ is the value of y coordinate for minimum design head loss across movable member.

References Cited in the file of this patent

UNITED STATES PATENTS

| | | |
|---|---|---|
| 1,904,337 | Turner | Apr. 18, 1933 |
| 1,944,088 | Linderoth | Jan. 16, 1934 |
| 2,827,076 | Obermaier | Mar. 18, 1958 |

FOREIGN PATENTS

| | | |
|---|---|---|
| 74,254 | Austria | Mar. 26, 1918 |
| 116,171 | Great Britain | of 1918 |
| 775,544 | France | of 1934 |